United States Patent
Zhao et al.

(10) Patent No.: US 11,913,125 B2
(45) Date of Patent: Feb. 27, 2024

(54) TRIMETALLIC LAYERED DOUBLE HYDROXIDE COMPOSITION

(71) Applicants: NEWSOUTH INNOVATIONS PTY LIMITED, Sydney (AU); KOHODO HYDROGEN ENERGY PTY LTD, Sydney (AU)

(72) Inventors: Chuan Zhao, Randwick (AU); Xin Bo, Kingsford (AU)

(73) Assignees: NEWSOUTH INNOVATIONS PTY LIMITED, Sydney (AU); KOHODO HYDROGEN ENERGY PTY LTD, Sydney (AU)

( * ) Notice: Subject to any disclaimer, the term of this patent is extended or adjusted under 35 U.S.C. 154(b) by 0 days.

(21) Appl. No.: 17/291,097

(22) PCT Filed: Nov. 5, 2018

(86) PCT No.: PCT/AU2018/051197
§ 371 (c)(1),
(2) Date: May 4, 2021

(87) PCT Pub. No.: WO2020/093081
PCT Pub. Date: May 14, 2020

(65) Prior Publication Data
US 2022/0002887 A1 Jan. 6, 2022

(51) Int. Cl.
*C25B 1/04* (2021.01)
*C25B 11/075* (2021.01)
*C01G 37/00* (2006.01)
*B01J 23/86* (2006.01)
(Continued)

(52) U.S. Cl.
CPC .......... *C25B 11/075* (2021.01); *B01J 23/866* (2013.01); *B01J 35/04* (2013.01); *C01G 37/006* (2013.01); *C25B 1/04* (2013.01); *B01J 23/007* (2013.01); *C01P 2002/22* (2013.01)

(58) Field of Classification Search
CPC ........ B01J 23/007; C01G 37/006; C25B 1/04; C01F 7/784; C01F 7/785
See application file for complete search history.

(56) References Cited

U.S. PATENT DOCUMENTS 5,518,704 A * 5/1996 Kelkar .................. B01J 23/007
423/420.2

FOREIGN PATENT DOCUMENTS

| JP | 6282787 B1 * | 2/2018 | ............... B32B 5/18 |
| WO | WO-9903779 A1 * | 1/1999 | ............ B01J 23/007 |
| WO | WO-2010118621 A1 * | 10/2010 | ............ B01J 23/007 |

(Continued)

OTHER PUBLICATIONS

Prevot et al., 3D hierarchical and porous layered double hydroxide structures: an overview of synthesis methods and applications,J Mater Sci (2017) 52:11229-11250.*

(Continued)

*Primary Examiner* — Jun Li
(74) *Attorney, Agent, or Firm* — Eric D. Babych; Barnes & Thornburg LLP

(57) ABSTRACT

A layered double hydroxide (LDH) material, methods for using the LDH material to catalyse the oxygen evolution reaction (OER) in a water-splitting process and methods for preparing the LDH material. The LDH material includes nickel, iron and chromium species and possesses a sheet-like morphology including at least one hole.

21 Claims, 7 Drawing Sheets

Figure 1:
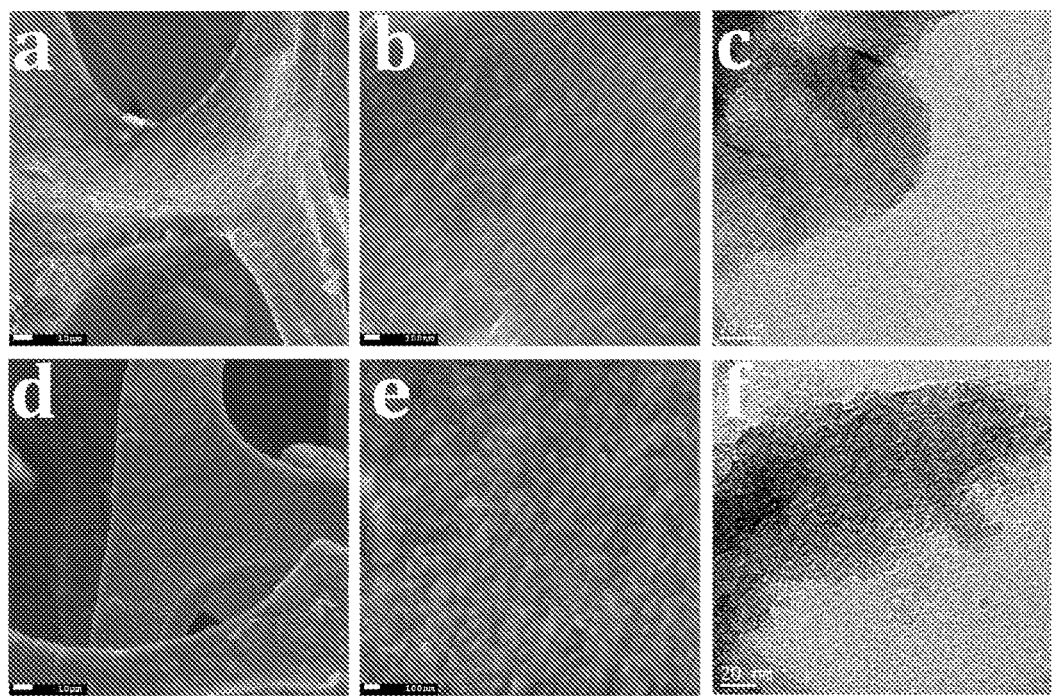
Figure 2:
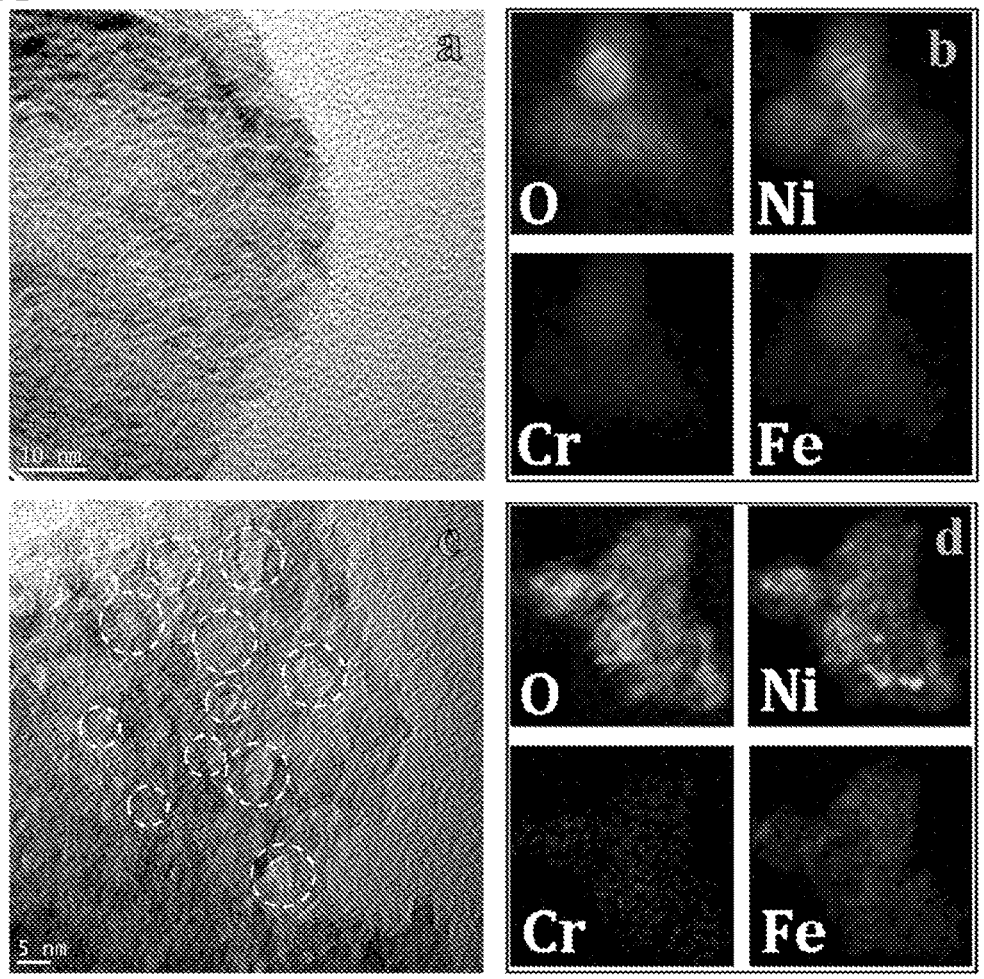

(51) Int. Cl.
*B01J 35/04* (2006.01)
*B01J 23/00* (2006.01)

(56) References Cited

FOREIGN PATENT DOCUMENTS

WO WO-2015076754 A1 * 5/2015 ............. C01B 13/36
WO 2017009666 A1 1/2017

OTHER PUBLICATIONS

Richetta M et al., Layered Double Hydroxides: Tailoring Interlamellar Nanospace for a Vast Field of Applications; Journal of Material Sciences & Engineering, 2017, vol. 6 • Issue 4 • 1000360, p. 1-9.*
Bo et al. Supplemental information of NiFeCr hydroxide Holey Nanosheet as Advanced Electrocatalyst for Water oxidation, Applied Mateirals &Interfaces, Sep. 2017.*
Fan et al., Supplemental information of 3D Core-Shell NiFeCr Catalyst on a Cu Nanoarray for Water Oxidation: Synergy between Structural and Electronic Modulation, ACS Energy Letters, Oct. 26, 2018, vol. 3.*
Wang et al. (Recent Progress on Layered Double Hydroxides and Their Derivatives for Electrocatalytic Water Splitting, Adv. Sci. May 2018, 1800064, published May 23, 2018.*
Bo, Xin et al. "NiFeCr Hydroxide Holey Nanosheet as Advanced Electrocatalyst for Water Oxidation," ACS Applied Materials and Interfaces (2017) 9(47), 41239-41245.
Fan, Lizhou et al. "3D Core-Shell NiFeCr Catalyst on a Cu Nanoarray for Water Oxidation: Synergy between Structural and Electronic Modulation," ACS Energy Letters (2018) 3, 2865-2874.
Jin, Song. "Electrocatalytic and photoelectrochemical water splitting using earth-abundant catalysts" presented at The 265th American Chemical Society National Meeting and Exposition, Aug. 19-23, 2018, Boston, MA. Abstract only available.
Wang, Kai et al. "Synthesis and photocatalytic properties of new ternary Ni—Fe—Cr hydrotalcite-like compounds," Ceramics International (2016) 42, 15981-15988.
Yang, Yang et al. "Highly Active Trimetallic NiFeCr Layered Double Hydroxide Electrocatalysts for Oxygen Evolution Reaction," Advanced Energy Materials (2018) 8, 1703189 (1-9).
PCT International Search Report and Written Opinion for PCT/AU2018/051197, dated Jan. 22, 2019, 11 pages.

* cited by examiner

TRIMETALLIC LAYERED DOUBLE HYDROXIDE COMPOSITION

FIELD OF THE INVENTION

The invention relates to a layered double hydroxide (LDH) material and methods for using the LDH material to catalyse the oxygen evolution reaction (OER) in a water-splitting process. The invention also provides a composition, a material and an electrode comprising the LDH.

BACKGROUND

Water-splitting processes are considered a sustainable approach to hydrogen generation and storage as they can exploit the abundance of available water and low carbon intensive energy source, such as a renewable source of energy (e.g. solar energy), as inputs. Water-splitting may be carried out in an electrolyser generating hydrogen at the cathode via the hydrogen evolution reaction (HER). Oxygen may be generated at the anode via the oxygen evolution reaction (OER).

In practice, water splitting is typically performed in strong alkaline electrolyte as most of the transitional metal-based electrodes cannot survive in strong acid conditions due to instability. The performance of water-splitting catalysts is limited by the relatively sluggish kinetics of the OER half reaction. OER involves a four-electron-transfer process. Therefore, besides the theoretically defined electrolysis potential value of 1.23 V, extra energy input is required to enable the decomposition of water molecules. This additional energy requirement is referred to as an overpotential ($\eta$) as a greater than theoretical potential is required to drive the electrolysis reaction.

Although noble-metal-based materials such as $IrO_2$ and $RuO_2$ can efficiently oxidize water into oxygen within an acceptable overpotential range, the industrial application for water splitting is still hindered by the high cost of such noble metals.

Recent efforts have focussed on developing water-splitting catalysts based on Earth-abundant metals. Earth-abundant metals exclude Re, Ru, Os, Rh, Ir, Pd, Pt, Ag and Au.

One promising class of Earth-abundant metal-based electrocatalysts are the layered double hydroxides (LDHs). Typically, LDHs consist of positively charged layers of a metal containing species interspersed with negatively charged anions in the interspacial region(s). One example of an LDH is a Ni—Fe LDH, which comprises $Ni^{2+}$ and $Fe^{3+}$ cations interspersed with counter anions. Ni—Fe LDHs have been shown to be efficient OER catalysts under alkaline conditions. However, the complex structure of Ni—Fe LDHs means that the catalytic site and mechanism of action are poorly understood, making their further development as electrocatalysts more difficult.

There has been one report of a complex LDH material comprising Ni, Fe and Cr elements. The ratio of Ni to the combined amount of Fe and Cr (i.e. Ni:(Fe+Cr)) is kept constant at 2:1.

There is a continuing need to further develop catalytic materials comprising earth abundant element(s).

SUMMARY OF THE INVENTION

The inventors have developed a composite material comprising nickel, iron and chromium interspersed with a hydroxide layer that is able to catalyse OER with low overpotentials ($\eta$). The composite material adopts a thin sheet morphology, and the inventors found that by etching the composite material a series of holes are formed that further enhances the OER catalytic activity of the composite material.

In one aspect, the invention provides a layered double hydroxide (LDH) material comprising a metal composite comprising nickel, iron and chromium species interspersed with a hydroxide layer, wherein the LDH material is in the form of a sheet comprising at least one hole. The at least one hole may be produced by removal of a portion of the chromium species.

In another aspect, the invention provides a catalytic material comprising the LDH material of the invention.

In a further aspect, the invention provides an electrode comprising a conductive substrate and a catalytic material coated onto a surface of the conductive substrate, the catalytic material comprising the LDH material of the invention.

In a still further aspect, the invention provides a method of evolving oxygen from water splitting, the method comprising providing an electrochemical cell comprising at least two electrodes and an electrolyte solution, contacting water with the at least two electrodes, and applying a voltage across the at least two electrodes, wherein at least one of the at least two electrodes comprises the LDH material of the invention.

In another aspect, the invention provides an electrolyser comprising at least two electrodes and a power supply, wherein at least one of the at least two electrodes comprises the LDH material of the invention.

In a further aspect, the invention provides a process for preparing a composite material comprising nickel, iron and chromium species on a substrate, the process comprising electrolysing a solution comprising nickel, iron and chromium precursors in solution that is in contact with the substrate to electrodeposit the composite material in the form of a sheet on the substrate, and processing the electrodeposited composite material to form one or more holes.

Before describing the present invention in detail, it is to be understood that this invention is not limited to particularly exemplified embodiments, methods of production or use, which may, of course, vary.

The inventions described and claimed herein have many attributes and embodiments including, but not limited to, those set forth or described or referenced in this summary section, which is not intended to be all-inclusive. The inventions described and claimed herein are not limited to or by the features or embodiments identified in this summary section, which is included for purposes of overview illustration only and not limitation.

All publications, patents and patent applications cited herein, whether supra or infra, are hereby incorporated by reference in their entirety.

It is to be understood that, if any prior art publication is referred to herein, such reference does not constitute an admission that the publication forms a part of the common general knowledge in the art.

BRIEF DESCRIPTION OF DRAWING(S)

The present application will be further described, by way of example only, with reference to the accompanying drawings, in which:

FIGS. 1*a-f* show (a, b) scanning electron microscope (SEM) images of the morphology of freshly prepared composite material comprising nickel, iron and chromium species on a nickel foam (NF) substrate prepared according to Example 1 prior to etching (NiFeCr/NF); (c) transmission electron microscopy (TEM) images of the NiFeCr/NF; (d, e) SEM and (f) TEM images of NiFeCr/NF after etching (h-NiFeCr/NF).

FIGS. 2a-d show (a) a high-resolution TEM (HRTEM) image of NiFeCr/NF; (b) an image of TEM-energy dispersive X-ray spectroscopy (TEM-EDS) mapping of NiFeCr/NF; (c) a HRTEM image of h-NiFeCr/NF; and (d) an image of TEM-EDS mapping of h-NiFeCr/NF.

Figure 3:
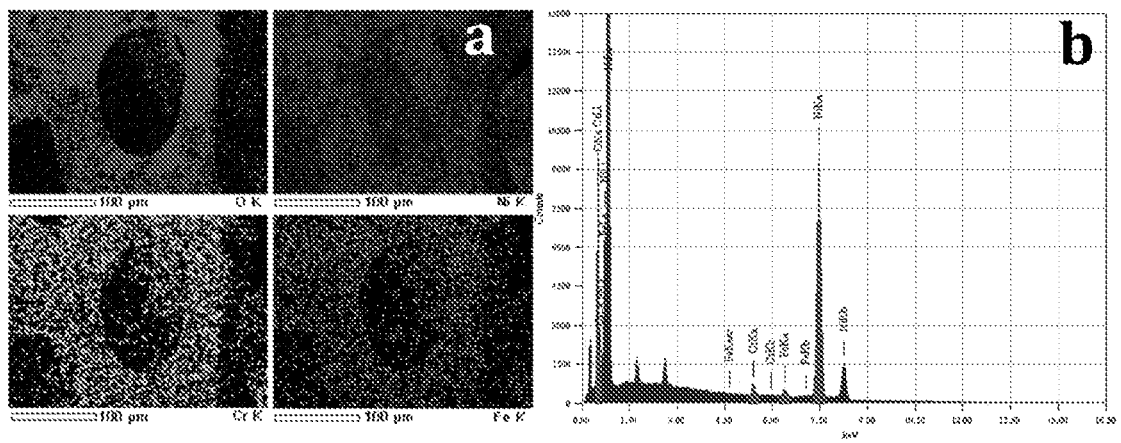

FIGS. 3a and b show (a) an image of SEM-EDS mappings of NiFeCr/NF and (b) a chart of energy dispersive X-ray spectroscopy (EDS) intensity of NiFeCr/NF.

Figure 4:
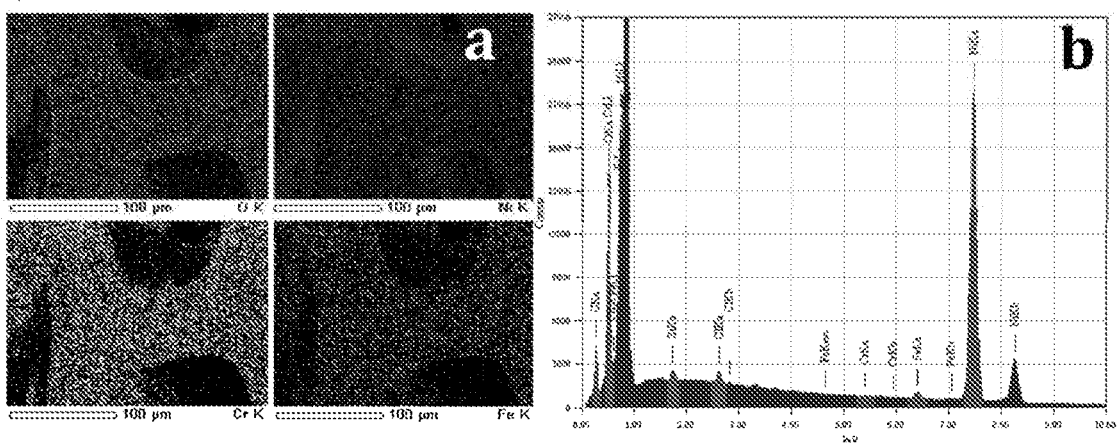

FIGS. 4a and b show (a) an image of SEM-EDS mappings of h-NiFeCr/NF and (b) a chart of energy dispersive X-ray spectroscopy (EDS) intensity of h-NiFeCr/NF.

Figure 5:
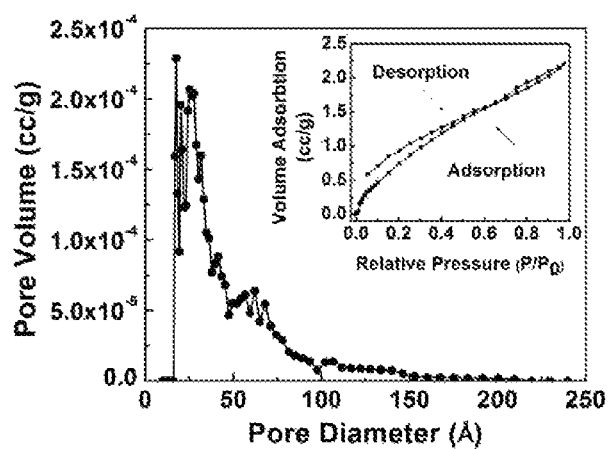

FIG. 5 shows a graph of pore volume vs pore diameter of the h-NiFeCr/NF, also showing typical $N_2$ adsorption-desorption isotherms in the insert.

FIGS. 6a-d show charts comparing core level X-ray photoelectron spectroscopy (XPS) results of NiFeCr/NF and h-NiFeCr/NF for (a) O1s, (b) Ni2p, (c) Fe2p and (d) Cr2p.

FIGS. 7a and b show linear sweep voltammetry (LSV) charts tested in 1 M KOH at 5 mC·s$^{-1}$ with 95% iR-compensation of a composite material comprising nickel, iron and chromium species on a NF substrate after etching (a) for various relative ratio of chromium precursor used in the electrodeposition process; and (b) after various electrodeposition times.

FIGS. 8a-d show (a) a LSV curves of h-NiFeCr/NF, composition material comprising nickel and iron species on a NF substrate prepared according to Example 1 (NiFe/NF) and NF at 5 mV·s$^{-1}$ with 95% iR-compensation in 1 M KOH; (b) cyclic voltammetry (CV) curves of h-NiFeCr/NF, NiFe/NF and NF at 10 mV·s$^{-1}$ without iR-compensation in 1 M KOH; (c) LSV curves and Tafel slope simulation (insert) of h-NiFeCr/NF and NiFe/NF in 1 M KOH at 0.1 mV·s$^{-1}$ with 95% iR-compensation; (d) a chart showing results of chronopotentiometric testing of h-NiFeCr/NF (lower) and NiFe/NF (upper) under the current density of 100 mA·cm$^2$ for 40,000 s without iR-compensation.

Figure 9:
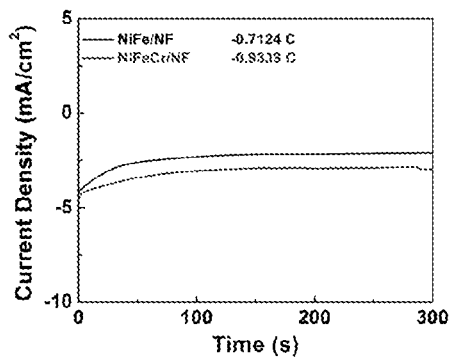

FIG. 9 shows a chart of current versus time (j-t curves) recorded during deposition of NiFe/NF (upper) and NiFeCr/NF (lower) under the applied potential of −1.0 V vs 1 M Ag/AgCl.

Figure 10:
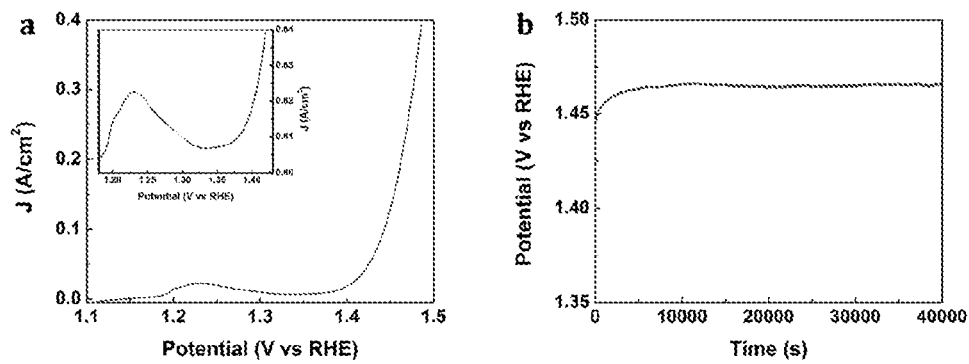

FIGS. 10a and b show (a) an LSV curve for OER catalyzed by h-NiFeCr/NF in 10M KOH at 5 mV·s$^{-1}$ with 95% iR-compensation and (b) a chart showing results of chronopotentiometric testing of h-NiFeCr/NF in 10M KOH for 40,000 s without iR-compensation.

FIGS. 11a-h show CV curves (a: NF, c: NiFe/NF, e: NiFeCr/NF, g: h-NiFeCr/NF) of non-Faraday process at scanning rates increasing from 10 mV/s to 80 mV/s in 10 mV/s increments and ECSA simulations (b: NF, d: NiFe/NF, f: NiFeCr/NF, h: h-NiFeCr/NF) of the relevant electrodes.

FIGS. 12a-d show Raman spectral data of NiFe/NF and h-NiFeCr/NF after the OER long-term testing described in Example 1; X-ray absorption near edge structure (XANES) images of (b) Cr, (c) Fe and (d) Ni in NiFeCr/NF (before) and h-NiFeCr/NF (after). The references to "before" and "after" in this figure relate to whether the XANES images were obtained before or after CV etching and long-term OER studies as described in Example 1.

Figure 13:
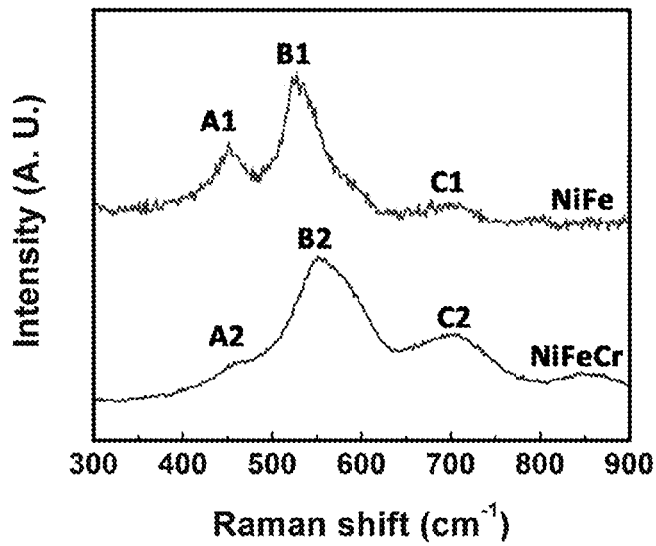

FIG. 13 shows Raman spectra of NiFe/NF and NiFeCr/NF.

Figure 14:
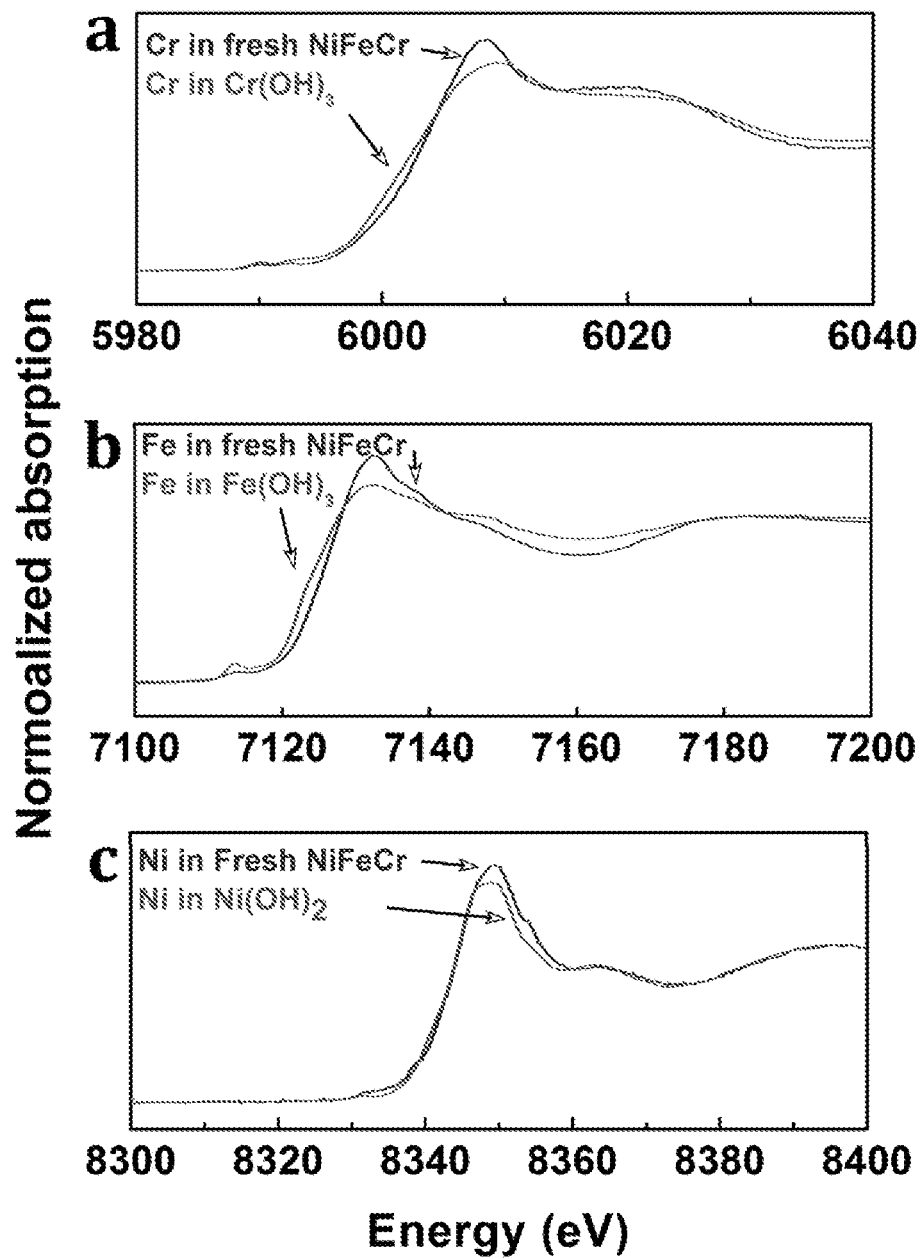

FIGS. 14a-c show XANES images of (a) Cr, (b) Fe and (c) Ni in relevant hydroxides (powders) as references, compared with NiFeCr/NF.

DEFINITIONS

As used herein, the term "water-splitting" relates to any process that generates elemental hydrogen or oxygen from water as the starting material. The water-splitting processes described herein are electrolytic in nature. In two-electrode electrolytic systems, these electrolytic processes typically involve the hydrogen evolution reaction (HER) at the cathode and the oxygen evolution reaction (OER) at the anode.

As used herein and in the appended claims, the singular forms "a," "an," and "the" include plural reference(s) unless the context clearly dictates otherwise. Thus, for example, a reference to "a hole" may include a plurality of holes or may be a reference to one or more holes, and so forth.

Unless defined otherwise, all technical and scientific terms used herein have the same meanings as commonly understood by one of ordinary skill in the art to which this invention belongs. It will be appreciated that any materials and methods similar or equivalent to those described herein can be used to practice or test the invention; the best-known embodiments of the various materials and methods are described.

The term "(s)" following a noun contemplates the singular or plural form, or both.

The term "and/or" can mean "and" or "or".

Unless the context requires otherwise, all percentages referred to herein are percentages by weight of the material.

Various features of the invention are described with reference to a certain value, or range of values. These values are intended to relate to the results of the various appropriate measurement techniques, and therefore should be interpreted as including a margin of error inherent in any particular measurement technique. Some of the values referred to herein are denoted by the term "about" to at least in part account for this variability. The term "about", when used to describe a value, may mean an amount within ±25%, ±10%, ±5%, ±1% or ±0.1% of that value.

The term "comprising" (or variations such as "comprise" or "comprises") as used in this specification, except where the context requires otherwise due to express language or necessary implication, is used in an inclusive sense, i.e. to specify the presence of the stated features but not to preclude the presence or addition of further features in various embodiments of the invention.

DESCRIPTION OF EMBODIMENT

The invention provides a layered double hydroxide (LDH) material comprising a metal composite comprising nickel, iron and chromium species interspersed within a hydroxide layer. The LDH material is in the form of a sheet comprising at least one hole.

Advantageously, the LDH materials of the invention demonstrate surprisingly improved OER catalytic activity compared with LDH materials comprising nickel alone and composite materials comprising the combination of nickel and iron. The LDH materials of the invention surprisingly also demonstrate improved OER catalytic activity compared with other NiFeCr LDH materials lacking the morphology of the LDH materials of the invention. The results for the NiFeCr LDH materials of the invention suggest that the chromium and iron species work synergistically to increase the catalytic activity of the nickel species. It is believed that the synergism may be a result of (1) a preventive effect against over-oxidation of nickel into an inactive state, (2) the modification of the character (e.g. amorphous or crystalline) of the nickel species in the presence of the iron and chromium species, and (3) the presence of the iron species and in particular the chromium species allows the creation of a morphology of the LDH material.

The LDH materials comprise a metal composite comprising nickel, iron and chromium species. In some embodiments, the metal composite is a ternary composite material (TCM) consisting essentially of nickel, iron and chromium. These ternary composite materials may comprise trace amounts of contaminating metals, such as Cu or other transition metal impurities. Trace amounts typically refer to amounts of up to 0.01 wt % of the composite.

The nickel species is typically a cationic species, such as $Ni^{2+}$ and/or $Ni^{3+}$.

The iron species is typically a cationic species, such as $Fe^{2+}$ and/or $Fe^{3+}$.

The chromium is typically a cationic species, such as $Cr^{3+}$ and/or $Cr^{6+}$.

The inventors found that upon formation of the NiFeCr LDH materials by electrolytic deposition the composite comprises nickel in the +2/+3 oxidation state. Following hole formation and use as OER catalyst, the oxidation state of the $Ni^{2+}$ centres is further oxidized to an oxidation state closer to the +3 oxidation state (e.g. ≤+3). It is believed that this higher oxidation state of the Ni centres is favourable for OER catalysis.

The relative amount of each of the nickel, iron and chromium species in the LDH material can be inferred from the relative concentration of the nickel, iron and chromium precursors used to synthesize the LDH material, from X-ray photoelectron spectroscopy (XPS) and from scanning electron microscopy or transmission electron microscopy coupled with energy dispersive X-ray spectroscopy (SEM-EDS/TEM-EDS).

The ratio of nickel species to iron species in the LDH material may be from about 1:1 to about 10:1 (Ni:Fe). For example, the ratio of nickel to iron species in the LDH material may be from about 1:1 to about 5:1, about 2:1 to about 4:1 or about 3:1.

Prior to hole formation, the ratio of nickel species to chromium species may be from about 2:1 to about 10:1 (Ni:Cr). For example, the ratio of nickel to chromium species in the LDH material may be from about 1:1 to about 5:1, about 2:1 to about 4:1 or about 3:1.

Prior to hole formation, the ratio of iron species to chromium species in the LDH material may be from about 2:1 to about 1:2, or about 1:1.

Typically, following hole formation the relative amount of chromium species in the LDH material reduces. The loss of chromium from the LDH material suggests that chromium acts as a sacrificial template for the hole forming process. However, the retention of chromium centres within the LDH materials is also believed to contribute to increasing its OER catalytic activity, so it is important that not all chromium species are removed during hole formation.

Following hole formation, the ratio of nickel species to chromium species may be from about 10:1 to about 100:1 (Ni:Cr). For example, the ratio of nickel to chromium species in the LDH material may be from about 10:1 to about 80:1, about 25:1 to about 75:1 or about 50:1. Following hole formation, the ratio of iron species to chromium species may be from about 5:1 to about 50:1 (Ni:Cr). For example, the ratio of iron to chromium species in the LDH material may be from about 10:1 to about 40:1, about 10:1 to about 30:1 or about 18:1.

The composite materials may comprise nickel, iron and chromium in a ratio of about 3:1:1 following preparation and about 3:1:0.05 following hole formation and/or use as an OER catalyst. The composite materials may comprise a ratio of nickel to the combination of iron and chromium of about 3:2 (Ni: (Fe+Cr)) prior to hole formation, and a ratio of nickel to the combination of iron and chromium of about 2:0.7 (Ni: (Fe+Cr)). These ratios may be expressed as a single number by dividing the value of the first component by the value of second component (i.e. relative amount of nickel divided by the sum of iron and chromium —Ni/(Fe+Cr)). Expressed in this way, the ratio of nickel to the combination of iron and chromium may be less than 2 (Ni/(Fe+Cr)) prior to hole formation (e.g. about 1.5) and may be greater than 2, such as at least about 2.5 after hole formation (e.g. from about 2.5 to about 10, about 2.8 to about 5, or about 2.85).

The concentration of each species present in the metal composite may be determined by SEM-EDS mapping. In some embodiments, the concentration of nickel species in the LDH materials may be from about 1% to about 5%, about 1% to about 3.5% or about 1% to about 2%. In some embodiments, when the LDH material is formed on a substrate comprising nickel, such as nickel foam, the nickel-content of the substrate may contribute to the measured concentration of nickel in the sample. In such embodiments, the concentration of nickel in the sample may be from about 40% to about 60%, about 40% to about 55% or about 45% to about 55%. In some embodiments, the concentration of iron species in the LDH materials may be from about 0.4% to about 1%, about 0.5% to about 0.8% or about 0.5% to about 0.7%. In some embodiments, the concentration of chromium species may be from about 0.001% to about 1%. For example, following hole formation, the concentration of chromium species may be about 0.001% to about 0.1%, about 0.01% to about 0.05% or about 0.02 to about 0.04%.

The concentration of each of the species present in the metal composite may alternatively be determined by XPS; however, XPS typically only detects elemental abundance within about 2-5nm of a surface of a material. In some embodiments, chromium may not be detected at all in the LDH material of the invention. Accordingly, in some embodiments, the LDH material comprises a surface layer that is free of chromium species as measured by XPS. Thus, the surface layer may extend by a depth of about 2 nm to about 10 nm, about 2 nm to about 8 nm or about 2 nm to about 5 nm. The ratio of nickel species to iron species in the surface layer may be from about 2:1 to about 5:1, about 2:1 to about 4:1, about 3:1 to about 4:1, about 3:1 or about 3.6:1 (Ni:Fe).

The composite may comprise nickel, iron and chromium species in any combination of the above described ratios and/or concentrations.

The LDH materials of the invention comprise the nickel, iron and chromium species interspersed with a hydroxide layer. The hydroxide layer is typically formed during synthesis. Typically, the hydroxide layer comprises amorphous hydroxide. Further, the hydroxide layer may also comprise cationic species corresponding to the metals comprised within the metal composite, such as nickel hydroxides and/or oxides, iron hydroxides and/or oxides and chromium hydroxides and/or oxides. In some embodiments, the LDH material comprises a $NiFe_{2-x}Cr_xO_4$ phase, where x is from 0 to 2 (e.g. 0, 1 or 2).

Typically, the LDH material also comprises water molecules and/or bicarbonate ions stored between layers of nickel, iron and chromium species. Prior to hole formation, the distance between layers of nickel, iron and chromium species is greater than or equal to about 8 Å. Following hole formation, the layer distance is reduced to less than 8 Å. In some embodiments, the layer distance may be from about 4 Å to about 7 Å, about 4.3 Å to about 6 Å or about 4.5 Å to about 5 Å.

The LDH materials adopt a sheet-like morphology. The LDH materials in the form of a sheet advantageously extend across a surface of a conductive substrate, enabling them to serve as OER catalyst and electrode.

The surface of the LDH material in the form of a sheet comprising at least one hole is roughened relative to a sheet-like morphology lacking holes. The hole of the LDH material may extend through the thickness of the sheet, or it may not extend through the entire thickness of the sheet. When the hole extends through the thickness of the sheet it is referred to herein as a "channel" whereas when it does not extend through the LDH material, the hole is referred to herein as a "pore". Typically, the LDH material may comprise a series of holes in its sheet morphology. These holes may comprise any combination of channels and/or pores.

In some embodiments, the sheet comprising a series of holes is a nanomesh, meaning that the average diameter of holes is less than 1 μm (1000 nm) In some embodiments, the minimum average diameter of the holes may be at least about 0.1 nm, about 0.5 nm, about 1 nm, about 2 nm, about 3 nm, about 4 nm or about 5 nm. In some embodiments, the maximum average diameter of the holes may be up to about 1000 nm, about 800 nm, about 700 nm, about 600 nm, about 500 nm, about 400 nm, about 300 nm, about 200 nm, about 100 nm, about 50 nm, about 30 nm, about 25 nm, about 20 nm, about 15 nm, about 10 nm, about 9 nm, about 8 nm, about 7 nm, about 6 nm or about 5 nm. The average diameter of the holes may be from any of the above minimum amounts to any of the above maximum amounts. In some embodiments, the average diameter of the holes may be from about 2 nm to about 10 nm, about 3 nm to about 8 nm, about 4 nm to about 6 nm, or about 5 nm. The average size of the holes may be determined by transmission electron microscopy (TEM). The holes may not be perfectly spherical and where there is doubt the largest measurable diameter is used for each hole to determine the average diameter. Embodiments of the LDH materials adopting a nanosheet morphology and comprising a series of holes may be referred to herein as having a nanomesh morphology.

While certain metal centres within the LDH material possess a degree of crystalline character, overall the LDH material typically exhibit an amorphous nature. The amorphous nature may be determined by high-resolution TEM, which will not show a clear lattice fringe for amorphous embodiments.

Also provided are catalytic materials comprising the LDH material described herein. The catalytic materials optionally comprise a substrate. Any suitable substrate that does not interfere with the OER catalytic activity of the LDH material may be employed. Suitable substrates include conductive metallic substrates (e.g. a metal substrate, such as a metal foam or metal mesh or fluorine-doped tin oxide (FTO)) and conductive non-metallic substrates (e.g. carbon fiber paper substrates). Suitable metal foams include nickel foam and copper foam. Suitable metal meshes include nickel mesh.

Also provided are electrodes comprising the LDH material and a conductive substrate. Any conductive substrate that does not interfere with the HER catalytic activity of the HER catalyst may be used, including those described above.

Preparative Methods

The LDH materials of the invention may be prepared by any means known in the art provided that a metal composite is formed comprising nickel, iron and chromium species being in the form of a sheet comprising at least one hole.

In some embodiments, the catalytic materials and/or electrodes of the invention may be prepared by an electrodeposition process.

Accordingly, described herein is a process for preparing a composite material comprising nickel, iron and chromium species on a substrate, the process comprising electrolysing a solution comprising nickel, iron and chromium precursors in solution that is in contact with the substrate to electrodeposit the composite material in the form of a sheet on the substrate, and processing the electrodeposited composite material to form one or more holes.

In this process, the chromium species serves to modify the character of the nickel species to be in a form that is more active as an OER catalyst and also serves as a sacrificial scaffold for the hole forming process. The hole formation in the sheet morphology of the substrate increases the electrochemical surface area providing greater access for the water OER substrate to the active nickel centres.

The process typically comprises contacting a conductive substrate with a solution comprising nickel, iron and chromium precursors, and applying a voltage across the conductive substrate and a counter electrode through the solution to electrodeposit a composite material comprising nickel, iron and chromium species in the form of a sheet on the substrate, and processing the electrodeposited composite material to form one or more holes.

In these preparative methods, the nickel, iron and chromium precursors are typically salts of nickel, salts of iron and salts of chromium. In some embodiments, the nickel, iron and chromium precursors may be nitrate salts. The solution may comprise up to about 100 mM nickel salts (e.g. up to about 50 mM or about 10 mM nickel salts). The solution may comprise up to about 100 mM iron salts (e.g. up to about 50 mM or about 10 mM iron salts). The solution may comprise up to about 100 mM chromium salts (e.g. up to about 50 mM or about 10 mM chromium salts).

The ratio of nickel precursor to iron precursor may be from about 5:1 to about 1:5 (Ni:Fe). For example, the ratio of nickel to iron precursors in the LDH material may be from about 3:1 to about 1:3 or about 2:1 to about 1:2, preferably about 1:1.

The ratio of nickel precursor to chromium precursor may be from about 10:1 to about 1:10 (Ni:Fe). For example, the ratio of nickel to iron precursors in the LDH material may be from about 5:1 to about 1:5 or about 4:1 to about 1:4.

The ratio of iron precursor to chromium precursor may be from about 10:1 to about 1:10 (Ni:Fe). For example, the ratio of nickel to iron precursors in the LDH material may be from about 5:1 to about 1:5 or about 4:1 to about 1:4.

The solution may comprise nickel, iron and chromium precursors in a ratio of about 1:1:0 to about 1:1:4. However, any ratio of the precursors described above may be selected for inclusion in the solution.

The solution may further comprise one or more electrolytes. Suitable electrolytes include salts, such as potassium chloride (KCl). The electrolyte may be present in a concentration of about 1 M.

In some embodiments, with a three-electrode system and constant potential input, the applied potential between the substrate and the reference electrode is about −0.6 V to −2.0 V vs reference, especially about −1.0 V vs reference.

In some embodiments, a constant current electroplating method is used where a constant current is applied to a two-electrode system. In these embodiments, the substrate and counter electrode are electrodes in a two-electrode electrolytic system. Any electrode that is stable under the deposition conditions may be used as counter electrode in these embodiments. For example, the counter electrode may be a carbon-based electrode (e.g. glassy carbon, carbon paper, graphite rod, and so on), a platinum-based electrode (e.g. a platinum electrode), or a titanium-based electrode (e.g. a titanium electrode). Further, in these embodiments, the voltage applied across the substrate and the counter electrode has a constant current. In such embodiments the magnitude and/or sign of the voltage may vary considerably provided the current is maintained at a substantially constant level. A suitable constant current is about 1 mA cm$^2$ to about 10 mA cm$^2$, such as from about 2 mA cm$^2$ to about 3 mA cm$^2$.

The voltage may be applied fora defined period of time. In some embodiments, the voltage is applied fora maximum period of up to 10 hours, for example, 5 hours, 3 hours, 2 hours, 1 hour, 1000 seconds, 600 seconds or 400 seconds. The minimum period for the voltage to be applied may be at least about 1 second, about 5 seconds, about 10 seconds, about 20 seconds, about 30 seconds, about 40 seconds, about 50 seconds, about 100 seconds, about 150 seconds, about 200 seconds, about 300 seconds or about 400 seconds. The period of voltage application may be from any of these minimum periods to any of these maximum periods without limitation, for example, from about 60 seconds to about 600 seconds or from about 100 seconds to about 400 seconds.

Typically, the solution is an aqueous solution. For aqueous solutions, $^-$OH ions are generated from electrodecomposition of water in the plating bath and these ions co-precipitate onto the substrate with the Ni, Fe and Cr species, thereby forming the hydroxide layer.

The preparative processes also comprise processing the electrodeposited composite material to form one or more holes. In preferred embodiments the holes are formed by selective removal of a portion of chromium species present in the LDH material. Any suitable means of removing the portion of chromium species may be employed.

In some embodiments, the processing step may comprise etching the surface of the sheet to remove a portion of the chromium species. In this context, etching involves contacting the surface with an etching solution comprising a strong base and optionally an electrolyte and applying a second voltage between the conductive substrate and the reference electrode. Typically, the etching solution is an aqueous solution.

The strong base in the etching solution may be a hydroxide base, such as sodium hydroxide, potassium hydroxide or ammonium hydroxide. The concentration of the strong base in the etching solution may be from about 0.1M to about 10M, preferably about 1M.

The second voltage may be from about −0.2V to about +0.6V vs reference. In some embodiments, the second voltage may be applied in a cyclic sweep across this range as for a cyclic voltammetry experiment. The second voltage may be applied in a number of cycles, such as up to 10 cycles or more. The scanning rate for each cycle may be from about 1 mV/s to about 50 mV/s, about 5 mV/s to about 20 mV/s, about 5 mV/s to about 15 mV/s or about 10 mV/s. The second voltage may be applied for a period from about 10 seconds to about 200 seconds, about 20 seconds to about 160 seconds, about 60 seconds to about 120 seconds, about 60 seconds to about 100 seconds, or about 80 seconds.

The etching step results in the removal of a portion of chromium species from the electrodeposited composite material. The portion of chromium species may be up to about 98% of the chromium species contained in the composite material prior to the etching step. In some embodiments, the portion of chromium species removed may be from about 50% to about 98%, about 75% to about 96% or about 90% to about 96%.

In some embodiments, the process further comprises a substrate pretreatment step, where the substrate is washed with a strong acid (such as 4M HCl) and ultrasonicated. The pretreatment step typically removes oxides and other impurities from the substrate surface prior to electrodeposition of the LDH material.

In some embodiments, the process also involves the inclusion of a reference electrode in the electrolysis cell and which is also in contact with the solution. Suitable reference electrodes include Ag/AgCl, Ag/Ag$_2$SO$_4$, Calomel, Hg/Hg$_2$SO$_4$ and Hg/HgO electrodes. In particular embodiments, the reference electrode, when used, is an Ag/AgCl electrode.

The conductive substrate may be a metal foam, such as a copper or nickel foam, preferably a nickel foam. Following electrodeposition, the metal foam may possess a mass loading of LDH material of about 1 mg/cm$^2$ to about 10 mg/cm$^2$, such as about 0.35 mg/cm$^2$ to about 4 mg/cm$^2$.

Methods of Use

The invention provides a method of evolving oxygen from water through a water splitting process. The method is carried out in an electrochemical cell, which comprises at least two electrodes and a container for an electrolyte solution, wherein at least one of the electrodes comprises the LDH material of the invention. The method comprises contacting water with the at least two electrodes of the electrochemical cell, and applying a voltage across the at least two electrodes.

In some embodiments, the electrochemical cell is a 2-electrode system, wherein the at least two electrodes correspond to an anode and a cathode. As the OER half reaction typically occurs at the anode, it is the anode that will typically comprise the LDH material of the invention.

In other embodiments, the electrochemical cell is a 3-electrode system, wherein the at least two electrodes correspond to a working electrode comprising the LDH material of the invention, a counter electrode and a reference electrode.

In some embodiments, the electrolyte solution is an aqueous electrolyte solution. The aqueous electrolyte solution may also be the source of the water. Typically, the water will have an alkaline pH, for example, a pH of at least 8, 9 or 10. In some embodiments, the water comprises a strong base, for example, a hydroxide base such as NaOH or KOH.

Typically, the cathode used in these methods will comprise a hydrogen evolution reaction (HER) catalyst, such as Pt/C.

When used in these methods, the LDH materials of the invention provide comparable catalytic activity to the present leading OER catalysts. Surprisingly, the LDH materials are able to provide similar catalysis while using Earth-abundant metals. Also surprisingly, the LDH materials are able to provide improved catalytic activity and require a lower overpotential to other known Earth-abundant metal-based OER catalysts, including corresponding NiFe LDHs (i.e. LDH materials prepared by similar routes but lacking chromium).

The voltage applied across the anode should be selected to match or exceed the overpotential for the LDH material in order to drive OER.

The LDH materials of the invention require relatively low overpotentials at the anode to drive OER. In some embodiments, the LDH materials catalyse OER with an overpotential of about 150 mV to about 300 mV, about 180 mV to about 280 mV or about 200 mV to about 260 mV to provide a charge density of about 100 mA cm$^{-2}$. The overpotential required to achieve a charge density of about 100 mA cm$^{-2}$ may vary depending on the electrolyte solution. In specific embodiments (see Example 1), in an electrolyte solution comprising 1M KOH, the overpotential required to achieve a charge density of about 100 mA cm$^{-2}$ while in an electrolyte solution comprising 10M KOH, the overpotential required to achieve a charge density of about 100 mA cm$^{-2}$ was about 200 mV. The theoretical minimum onset potential for OER is 1.23V. In some embodiments, the onset potential for OER catalyzed by the LDH material of the invention may be from about 1.3V to about 1.5V, about 1.35V to about 1.45V, about 1.43 or about 1.37V. Accordingly, in some embodiments, the voltage applied to the solution will be at least 1.3 V vs RHE, for example, from 1.3 V vs RHE to about 3 V vs RHE, about 1.35 V vs RHE to about 3 V vs RHE, about 1.35 V vs RHE to about 3 V vs RHE, about 1.35 V vs RHE to about 2.5 V vs RHE or about 1.35 V vs RHE to about 2 V vs RHE.

Nickel-based OER catalysts typically suffer from oxidative passivation when used in OER. The inclusion of the iron and chromium species in the LDH materials of the invention impedes the passivation of the catalytic nickel species. Thus, the LDH materials of the invention may be used in the methods of evolving oxygen for extended periods of time. In some embodiments, the voltage is applied across the at least two electrodes without significant loss of OER catalytic activity for greater than about 5 hours, about 10 hours, about 20 hours, or longer.

Also provided is an electrolyser comprising at least two electrodes and a container for an electrolyte solution and optionally a power supply, wherein at least one of the electrodes comprises the LDH materials of the invention. The at least two electrodes are positionable within the container such that a voltage can be applied across the electrodes through an electrolyte solution held within the container. In some embodiments, the position of the at least two electrodes is fixed within the container. The electrolyser typically comprises 2 or 3 electrodes. The electrolyte solution may be any of the electrolyte solutions described herein. In some embodiments, the power supply provides electricity generated from a low carbon intensive power source. The power source may be a renewable power source, for example, one or more solar panels or wind turbines, or a non-renewable power source, for example, a nuclear reactor.

EXAMPLES

The invention will be further described by way of non-limiting example(s). It will be understood to persons skilled in the art of the invention that many modifications may be made without departing from the spirit and scope of the invention.

Example 1

Experimental
Materials Synthesis.

All the chemicals used were sourced from supplier without further purification. Nickel Foam (NF, 1.5 mm thickness) was sonicated in 4 M hydrochloric acid (HCl, 32%, RCI LABSCAN Ltd) for 10 min to remove $NiO_x$ layer on the surface and rinsed subsequently with Mill-Q water at least three times, then dried in air. The NF was sealed with Teflon tape and the exposed geometric surface area was 1×1 cm$^2$. The electrolyte containing 3 mM nickel nitrate (Ni$(NO_3)_2 \cdot 6H_2O$, 98%, Ajax Finechem Pty Ltd), 3 mM iron nitrate ($Fe(NO_3)_3 \cdot 9H_2O$, 98%, Ajax Finechem Pty Ltd) and 0 mM to 4 mM chromium nitrate ($Cr(NO_3)_3 \cdot 6H_2O$, 99%, Ajax Finechem Pty Ltd) was prepared. The NiFeCr/NF electrode was electrodeposited in a standard three-electrode system (CHI760), in which NF is working electrode, graphite plate as a counter electrode and silver/silver chloride electrode (Ag/AgCl, 1 M KCl) as reference electrode. The depositing potential was −1.0 V vs Ag/AgCl, lasting for 100-400 seconds (s). After deposition, the obtained electrode was carefully withdrawn from electrolyte, rinsed by water and dried in air. The NiFe/NF electrode (control) was electrodeposited in the similar electrolyte without chromium under the applied potential of −1.0 V for 300 s. Then obtained NiFeCr/NF was subjected to cyclic voltammetry (CV)-activation to dissolve the chromium soft template, ranging from −0.2~0.6 V vs Ag/AgCl (saturated KCl) in 1 M potassium hydroxide electrolyte (KOH, Chem Supply) for at least ten cycles as an etching-activation process. Thereafter the h-NiFeCr/NF electrode was measured to demonstrate the relevant electrochemical behavior such as linear sweep voltammetry (LSV), cyclic voltammetry (CV) and chronopotentiometric (long-term stability testing).

Characterisation Techniques

X-ray diffraction spectroscopy (XRD). XRD measurements were performed with PANalytical X'Pert Empyrean instrument equipped with standard Cu anode, K-α wavelength=1.54nm. The typical scan range was 10° to 80°, collected with step size of 0.039° s$^{-1}$.

X-ray photoelectron spectroscopy (XPS). XPS measurements were performed with Thermo ESCALAB250i X-ray photoelectron spectrometer, to ensure the results consistency the scan was performed at 4 different spots.

Raman spectroscopy. Raman spectra analysis, Renishaw inVia Raman microscope equipped with 514 (green) Ar-ion laser with 1800 I mm$^{-1}$ was used. All the Raman samples were catalysts supported on NF.

Transmission electron microscopy (TEM). TEM was carried out with Phillips CM 200 microscope. To prepare TEM samples, the NF supported catalyst was transferred to Cu-grid by physically scratching the electrode using a sharp knife. The resulting powder was dispersed in absolute ethanol by ultrasonication for 15 mins. The resulting mixture was then drop-casted onto Cu-grid and dried in room temperature.

High resolution transmission electron microscopy (HR-TEM) and X-ray energy-dispersive (EDS) mapping images. HRTEM and EDS mapping was carried out with Phillips CM 200 microscope. To prepare HRTEM samples, the NF supported catalyst was transferred to Cu-grid coated with holey carbon by sonication of the sample off the NF in absolute ethanol for 15 mins. The resulting mixture was then drop-casted onto Cu-grid and dried in room temperature.

Scanning electron microscopy. SEM analysis were carried out with JEOL F7001 with a 17 kV accelerating voltage.

Optical microscopy. Microscopy images were taken with Nikon eclipse LV100POL.

X-ray absorption near edge structure (XANES) and extended X-ray absorption fine structure (EXAFS). XANES and EXAFS were recorded on the multiple wiggler XAS beamline 12 ID at the Australian Synchrotron.

Brunauer-Emmett-Teller apparatus (BET). The specific surface area and pore distribution of the catalyst were obtained by using BET. The BET employed was a Quadrasorb SI and the sample was placed in a $N_2$ atmosphere at 200° C. using degas procedure.

X-ray Absorption Spectroscopy (XAS). XAS data were recorded on the multiple wiggler XAS beam-line 12 ID at the Australian Synchrotron. Fluorescent-mode XAS data were taken directly on the NiFeCr composites catalysts electrodeposited on Ni/GC (Nickel coated glass carbon, 1×1 cm$^2$) using the procedure described above at room temperature before and after etching-activation. The XAS data were analyzed and transformed by software Sakura and Athena.

Electrochemical measurements. Linear sweep voltametry (LSV), CV and chronopotentiometry were introduced to measure the OER performance of the synthesized catalysts in aqueous 1 M KOH. All potentials applied were calibrated to reversible hydrogen electrode (RHE) using equation (1):

$$E_{RHE} = E_{Ag/AgCl} + 0.197 + 0.059 \cdot pH \quad (1)$$

The electrochemically active surface area (ECSA) is calculated based on the double layer capacitance of the synthesized electrodes during non-Faraday process. The double-layer charging current, $I_c$, is equal to the scan rate, v, and to the electrochemical double-layer capacitance, C, as described in equation (2):

$$I_C = v \cdot C_{DL} \quad (2)$$

According to equation (2), the ECSA can be calculated by measuring CVs at various scanning rates.

The turn over frequency (TOF) can be calculated by equation (3):

$$TOF = j \times A / (4 \times F \times m) \quad (3)$$

where j is the current density at a certain overpotential, A is the area of the electrode, F is the faraday constant (96,485 C/mol) and m is the moles of the active materials deposited on the substrate.

The Tafel Slope was recorded and derived from near-static LSV at the scanning rate of 0.1 mV s−1 with 95% iR-compensation.

Results and Discussion

To prepare the h-NiFeCr/NF composite, Cr was introduced into the LDH by electrodeposition and utilized as a soft-template and doping element. The electrodeposition was carried out under an applied potential of −1.0 V vs Ag/AgCl (1 M KCl) in the electrolytes containing $NO_3^-$, which could be reduced into $NH_4^+$ and $OH^-$ ions and then co-precipitate with the local $Ni^{2+}$, $Fe^{3+}$ and $Cr^{3+}$ ions onto NF substrate (denoted as NiFeCr/NF). Afterwards, the obtained NiFeCr/NF electrode was subjected to electrochemical etching by multiple cyclic voltammetry (CV) scans in the potential range between −0.2 and 0.6 V vs Ag/AgCl (1 M KCl) in 1 M KOH. During this process, partial $Cr^{3+}$ in LDHs dissolves into the strong alkaline electrolyte ($Cr(OH)_3 + OH^- \rightarrow [Cr(OH)_4]^-$), generating pores in the LDHs, resulting in a holey NiFeCr hydroxide composites on NF (denoted as h-NiFeCr/NF).

The morphology of the freshly prepared NiFeCr/NF before etching is studied by scanning electron microscope (SEM) and transmission electron microscopy (TEM) in FIG. 1, showing a nanosheet structure. High resolution TEM (HRTEM) (FIG. 2a) shows there is no obvious lattice fringe in the nanosheet, indicating the amorphous nature. TEM-EDS in FIG. 2b demonstrates the uniform dispersion of Ni, Fe, Cr and O respectively. The EDS mappings (FIG. 3) of the composites also demonstrate that the O (17.40%), Cr (0.61%), Ni (51.50%) and Fe (0.53%) elements are uniformly dispersed on NF substrate. The Ni content determined by EDS mapping comprises the nickel of the h-NiFeCr and of the NF substrate. After the etching process, it is found the surface of the h-NiFeCr/NF electrode was further roughened (FIGS. 1d and 1e). Many holes with diameter around 5 nm were formed on the nanosheet structure (FIG. 2c and FIG. 10. The formation of nanopores is accompanied by a significant decrease in the EDS signal of chromium (FIG. 4) from 0.61% to 0.03%, suggesting Cr serves as a sacrificial template for the generated pores. The EDS intensity shown in FIG. 4 indicates that following etching the composite comprises Ni (49.14%), Fe (0.53%), Cr (0.03%) and O 0 (23.55%) in a substantially even distribution. The pores offer enlarged specific surface area and easy access to the exposed active sites, as well as fast mass transport, leading to improved OER activity. The pore-size distribution was evaluated by Brunauer-Emmett-Teller (BET) testing shown in FIG. 5, indicating the formation of pores with a size distribution from about 2 nm to about 10 nm, which correlates with the pore size observed by TEM. The inserted adsorption-desorption curve shows a typical II isotherm and the calculated specific surface area of the deposited catalyst on NF is 3.817 m$^2$/g (by considering of mess distribution with NF substrate). TEM-EDS signal of h-NiFeCr/NF in FIG. 1d also shows that trace amount of chromium is anchored in h-NiFeCr/NF after the etching process.

Figure 6:
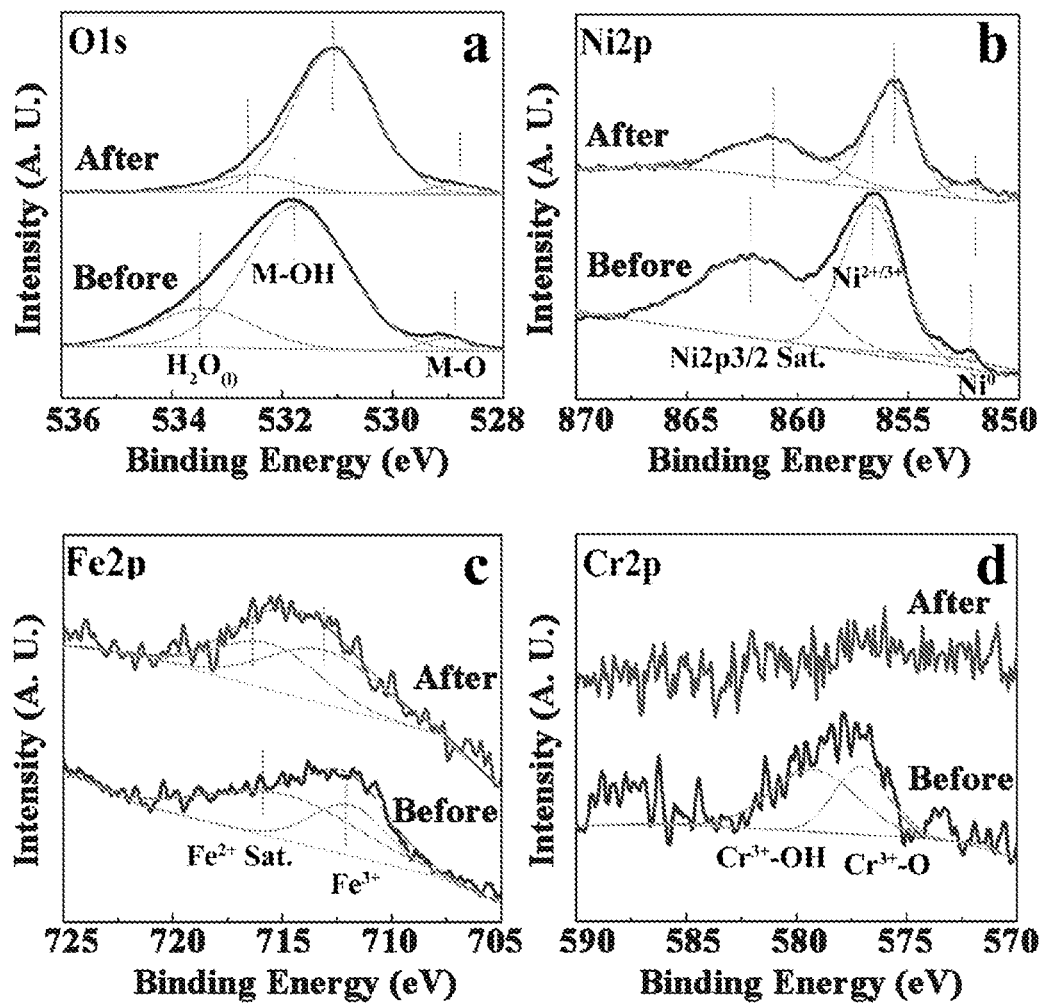

To study the surface chemical composition and oxidation state of the NiFeCr LDHs before and after the electrochemical etching process, X-ray photoelectron spectroscopy (XPS) measurements were carried out (see FIG. 6). In O1s spectroscopy (FIG. 6a), three simulated peaks appearing at ∼532.6, ∼531.8 and ∼528.9 eV are identified as O in $H_2O_{(l)}$, M-OH and M-O, respectively. After electrochemical etching, all the peaks shift negatively. Of note, by simulation the fitted peak area, the relative intensity ratio of peak $H_2O_{(l)}$ to peak M-OH decreased from 0.316 (before) to 0.141 (after etching), indicating the $H_2O$ amount reduced after etching process. This state of $H_2O$ is considered to be stored between the layers of the $\alpha$-Ni(OH)$_2$, whose layer distance is ≥8 Å. As the material is activated in alkaline under CV cycling, $\alpha$-Ni(OH)$_2$ is aged into $\beta$-NiOOH, whose layer distance is further decreased to 4.8 Å, leading to the extrusion of $H_2O$ between the layers and thus less amount of $H_2O$ than that of the non-activated sample is detected by XPS. For the M-O simulation, the relative intensity ratio of fitted peak M-O to peak M-OH before (0.075) and after etching (0.076) maintains between the closed values. Ni2p XPS spectroscopy in FIG. 6b shows characteristic peaks at ∼856.6 eV with a satellite peak at ∼862.4 eV of Ni2p3/2, indicating the oxidation state of nickel is $Ni^{2+/3+}$. The weak signal at ∼852.5 eV is assigned to $Ni^0$, which is from NF substrate. After CV etching the $Ni^{2+/3+}$ peaks shift to lower binding energy, indicating the binding energy of Ni—O is weakened and oxidization valence of Ni is lowered. Although the absolute intensity of peak Ni2p3/2 decreased, the relative intensity ratio of Ni2p3/2 peak to Ni2p3/2 satellite peak before (0.749) and after etching (0.741) are similar. The Ni2p fitting may involve contributions from interatomic, non-local electronic coupling and screening effects with multiple structures, which may account for the slight shift in value before and after etching. When it comes to Fe2p XPS (FIG. 6c), two fitting peaks at ∼716.2 eV and ∼712.1 eV were observed, assigned to Fe satellite and $Fe^{3+}$, respectively. These peaks shift slightly to higher binding energy after CV etching, indicating the formation of shorter Fe—O bond for optimal adsorption energies of OER intermediates on the surface of composites. The Cr2p spectroscopy (FIG. 6d) exhibits two fitted peaks at ∼579.7 eV and ∼577.2 eV, assigned to $Cr^{3+}$—OH and $Cr^{3+}$—O respectively.

Figure 7:
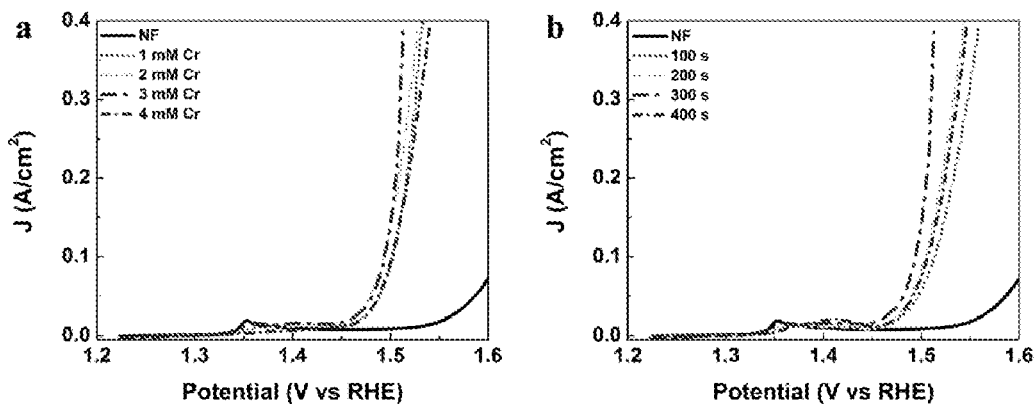
Figure 8:
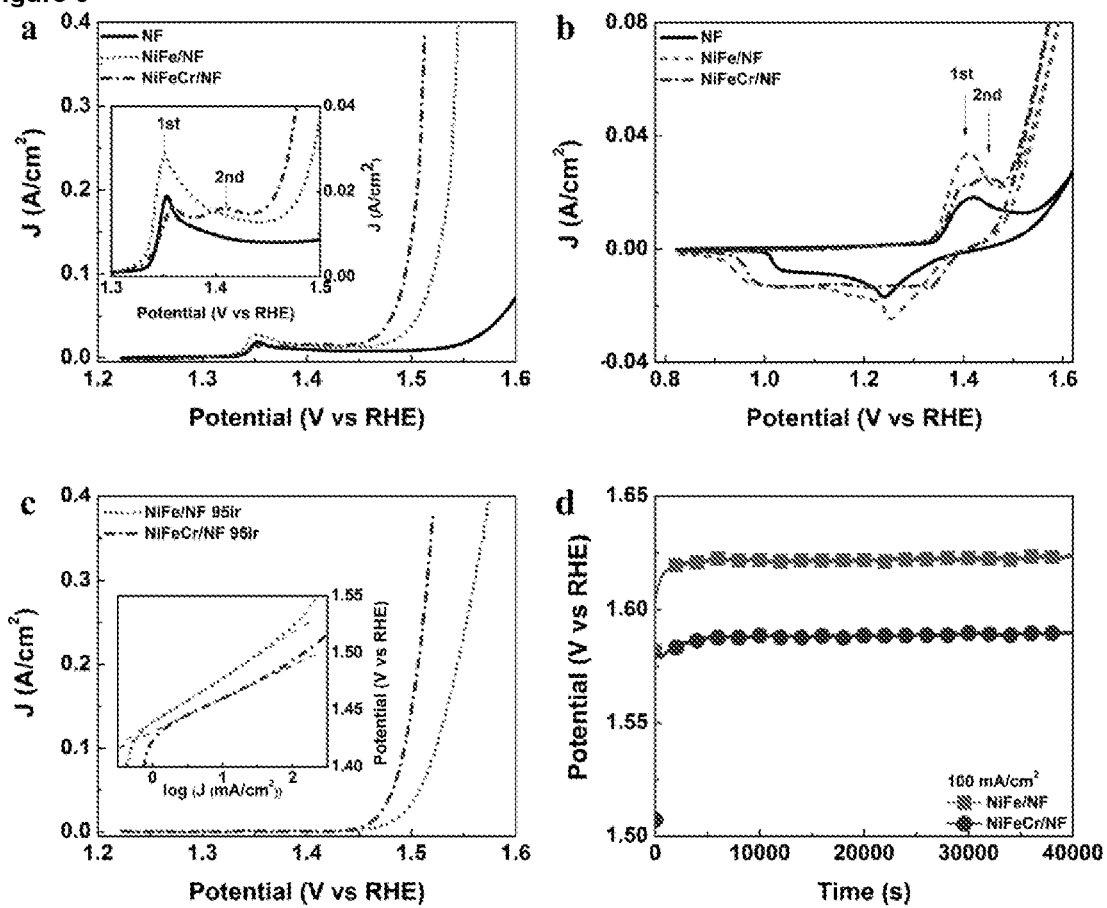

The impact of varying the relative amount of Cr and deposition time in the production of the h-NiFeCr/NF electrode on OER performance was assessed (see FIG. 7). The optimized h-NiFeCr/NF electrode exhibits a significantly enhanced OER performance compared to the benchmark NiFe/NF (FIG. 8). The onset potential of the h-NiFeCr/NF is only 1.43 V vs RHE, corresponding an overpotential ($\eta$) merely of 200 mV, in comparison to $\eta$=220 mV for NiFe/NF. To achieve a high current density (j) of 100 mA·cm$^{-2}$ (FIG. 8a), the overpotential ($\eta$) of h-NiFeCr/NF is only 260 mV, which is smaller than that of NiFe/NF ($\eta$=295 mV). These results (with/without Cr incorporation) are shown in Table 1 below.

TABLE 1

Characterisation of OER catalysis using the LDH materials of Example 1

| Catalyst | Certain concentrated electrolyte | Onset potential (vs RHE) | Overpotential under a certain current density | iR comp. |
|---|---|---|---|---|
| h-NiFeCr/NF | 1M KOH | 1.43 V | 260 mV, 100 mA · cm$^{-2}$ | 95% |
| h-NiFeCr/NF | 10M KOH | 1.37 V | 200 mV, 100 mA · cm$^{-2}$ | 95% |
| NiFe/NF | 1M KOH | 1.45 V | 260 mV, 100 mA · cm$^{-2}$ | 95% |

In FIGS. 9a and 9b two oxidation peaks are observed at 1.36 V (1$^{st}$ peak) and 1.41 V (2$^{nd}$ peak) vs RHE in both linear sweep voltammetry and in cyclic voltammetry. The first peak, which is detected in all the samples, is due to the phase transition from $\alpha$-Ni(OH)$_2$ to $\gamma$-NiOOH. The second oxidation peak, attributed to the oxidation of $\beta$-Ni(OH)$_2$ into more active $\beta$-NiOOH, is observed in the composite incorporated with Cr. The turn over frequency (TOF) is also calculated to understand the improvement from introduction of chromium into NiFe composite. According to the XPS, the atomic ratio of Ni: Fe: Cr is ~3:1:1 for the NiFeCr/NF sample, which corresponds to an assumed chemical formula of Ni$_3$FeCr (OH)$_{12}$. Therefore, the electrodeposition proceeds according to the reaction of 15Ni$^{2+}$+5Fe$^{3+}$+5Cr$^{3+}$+6NO$_3^-$+42H$_2$O+ 48e→6 NH$_4^+$+5Ni$_3$FeCr(OH)$_{12}$. Thus, the electrodeposited Ni$_3$FeCr(OH)$_{12}$ catalyst amount is calculated to be ~1.01 µmol according to Faraday's law and to the quantity of electronic charge it consumed (0.9339 C simulated from FIG. 9). Under the overpotential of 250 mV with the current density of 43.28 mA·cm$^{-2}$, the TOF value of h-NiFeCr/NF is achieved as 0.11 s$^{-1}$. Similarly, the quantity of charge consumed during NiFe composite deposition is 0.7124 C in FIG. 9, so the amount of NiFe composite on NF is 0.92 µmol with an assumed chemical formula of Ni$_3$Fe(OH)$_9$. Thus, the TOF value of NiFe composite at overpotential of 250 mV is calculated to be 0.03 s$^{-1}$. In comparison, the TOF of h-NiFeCr composite at 250 mV is more than three times larger than that of NiFe composite, indicating faster response in OER reaction due to the introduction of chromium and the modified holey morphology.

The kinetics of the electrodes were further investigated from the derived Tafel slopes (FIG. 8c). The Tafel slope of h-NiFeCr/NF is merely 29 mV·dec$^{-1}$, lower than the NiFe/NF (b=39 mV·dec$^{-1}$), indicating significantly faster OER kinetics for h-NiFeCr/NF. The electrochemical stability of the h-NiFeCr/NF electrode was tested in 1 M KOH electrolyte at a constant current density of 100 mA·cm$^{-2}$ (FIG. 8d). Both NiFe and h-NiFeCr composites show durable water oxidation stability for more than 10 hours without degradation. The feedback potential of h-NiFeCr electrode around ~1.58 V vs RHE is achieved under the same current density, indicating the existence and partial dissolving of Cr has no influence on the chemical stability of the composite. Moreover, this value is much lower than that of NiFe/NF electrode (~1.62 V vs RHE) at the same current density, confirming the improved OER activity of the h-NiFeCr/NF electrode resulting from the inclusion of Cr and its synergy with Fe and Ni within the OER catalyst. Furthermore, the obtained h-NiFeCr/NF electrode was tested under extreme conditions by using highly concentrated electrolytes (10 M KOH), and showed exceptionally low onset potential (1.37 V, FIG. 10a) and excellent long-term stability (FIG. 10b).

Figure 11:
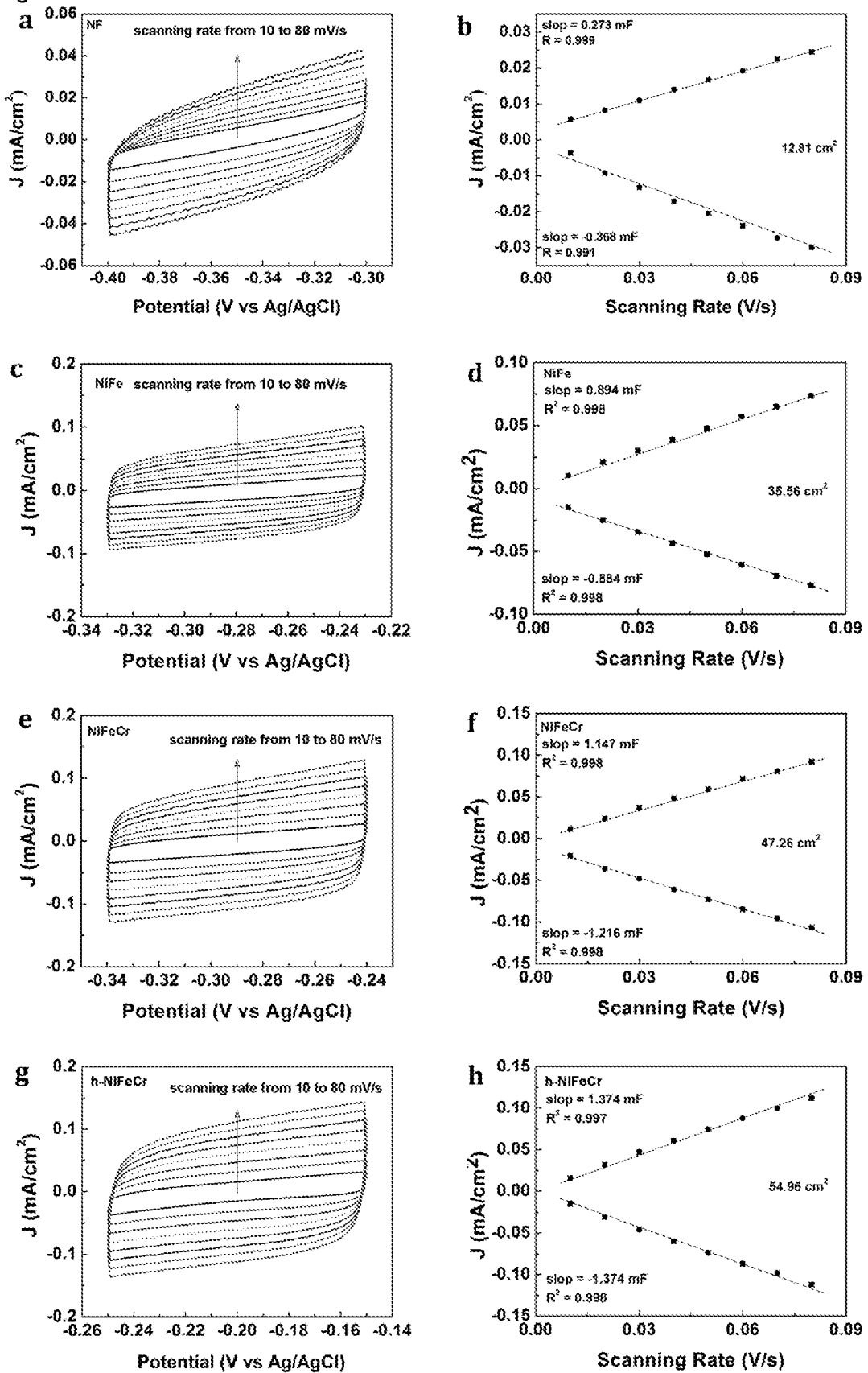

The origins of the remarkable catalytic activity have been investigated and several factors are found to contribute to the enhancement of OER performance. As mentioned above, Cr can be dissolved in strong alkaline media to form porous structure on the catalyst surface. Therefore, the electrochemical surface area (ECSA) of the h-NiFeCr/NF electrode after etching is increased. We determine the ECSA of the catalysts by measuring its double layer capacitance ($C_{dl}$), using the CV method in a non-Faradaic potential region. FIG. 11 shows the CVs at various scanning rates. By simulation, the ECSAs of NF, benchmark NiFe/NF, NiFeCr/NF and h-NiFeCr/NF are 12.81, 35.56, 47.26 and 54.96 cm$^2$, respectively. The ECSA of the h-NiFeCr/NF increased as a result of the introduction of the holes into its morphology.

Besides acting as a template for generating holes in the LDH morphology, the remaining chromium also plays a synergistic role together with iron to modulate the electronic structure of the active nickel site for OER. As shown in FIGS. 9a and 9b, there are two oxidation peaks prior to OER. The 2$^{nd}$ oxidation peak which appears only in the h-NiFeCr/NF sample suggests the formation of $\beta$-NiOOH phase (Ni oxidized state<+3), which is more active than $\gamma$-NiOOH (Ni oxidized state ~+3.6) for OER. The $\beta$-NiOOH phase can be transferred back into $\gamma$-NiOOH when $\beta$-NiOOH is over charged, which explains why pure nickel LDH shows limited OER performance in purified KOH electrolyte. Fe incorporation in nickel LHDs can prevent $\beta$-NiOOH from depression, thus leading to enhanced OER activity. Raman spectroscopy is further applied to identify the existence of $\beta$-NiOOH phase. The freshly made NiFe and NiFeCr hydroxide composites on NF experienced CV etching and long-term OER testing. Then the Raman analysis was carried out to show their activated properties. As in FIG. 12a, peak A' and B' represent the active Ni—O vibration state after OER performance. The more $\beta$-NiOOH existence, the stronger peak B' can be observed. The intensity ratio of B2'/A2' is ~0.97 in h-NiFeCr/NF electrode, while the intensity ratio of B1'/A1' peak is only ~0.59 in NiFe/NF, indicating more active $\beta$-NiOOH phase is formed during the OER process when the chromium is present. Raman data of the freshly made NiFe and NiFeCr hydroxide composites on NF are also given in FIG. 13. Peaks A and B are ascribed to Ni—O vibration state in hydroxide composite and peak C represents the NiFe$_2$O$_4$ phase. B2 and C2 peaks are broadened after introduction of chromium, indicating more defects and more active NiFe$_{2-x}$Cr$_x$O$_4$ phase are formed.

Figure 12:
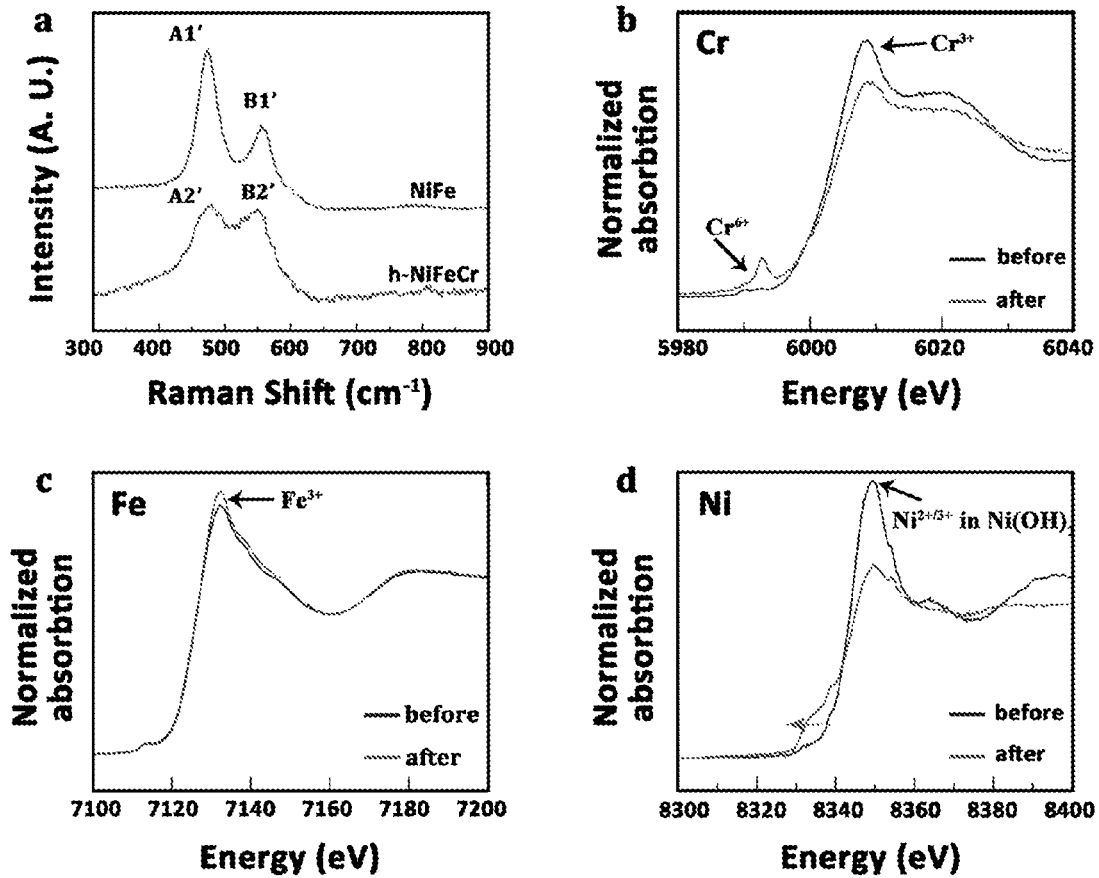

Finally, to confirm the presence of chromium retained in the LDH after etching and to further understand the function of chromium for OER, bulk sensitive X-ray absorption near edge structure (XANES) mode was applied to analysis the structure of h-NiFeCr/NF electrode. As shown in FIG. 12b, the oxidation state of the chromium in NiFeCr/NF is identified as +3. After etching and long-term OER testing, a small peak at around 5,993 eV corresponding to Cr$^{6+}$ state is observed. FIG. 12c shows the oxidation state (+3) of Fe is relatively stable before and after long-term oxidation. As for nickel (FIG. 12d), the nickel oxidation state is assigned as $Ni^{2+/3+}$. The oxidation state of Ni presents an even lower valence and is further evidenced by the negative shift around 8,334 eV in pre-edge curve after etching and long-term OER testing. Therefore, the presence of the remaining $Cr^{6+}$ likely keeps Ni at in a lower oxidation state, which is more active towards OER catalysis. This phenomenon is also consistent with the XPS results (FIG. 6), where a lower oxidation state for Ni was observed. The XAS data of the relevant metallic hydroxide powders are also given as references in FIG. 14.

Conclusion.

A highly active holey NiFeCr hydroxide composite electrode with abundant pores and optimized electronic structures has been developed by a facile electrodeposition-etching approach for enhanced water oxidation. The outstanding OER performance of the h-NiFeCr/NF may be attributed to several factors: (i) The co-deposited chromium in NiFe hydroxide composite acts as soft template to introduce holes to NiFe hydroxide composite structure and subsequently improve the ECSA and mass transport; (ii) Under an applied anodic potential, the synergistic effects between Ni, Fe and Cr produce optimized M-O bond and more active β-NiOOH phase in LDH to accelerate the OER kinetics; (iii) $Cr^{3+}$ is partially transformed into the $Cr^{6+}$, which keeps Ni at a relatively lower oxidation state and enhances OER ability.

The invention claimed is:

1. A layered double hydroxide material comprising a metal composite comprising nickel, iron and chromium species interspersed with a hydroxide layer, wherein the layered double hydroxide material is in the form of a sheet comprising at least one hole, and wherein the metal composite comprises iron and chromium in a ratio of about 10:1 to about 40:1 on a molar basis.

2. The layered double hydroxide material of claim 1, wherein the sheet comprising at least one hole is a nano-mesh.

3. The layered double hydroxide material of claim 1, wherein the metal composite comprises $Ni^{2+}$ and/or $Ni^{3+}$.

4. The layered double hydroxide material of claim 1, wherein the metal composite comprises $Fe^{2+}$ and/or $Fe^{3+}$.

5. The layered double hydroxide material of claim 1, wherein the metal composite comprises $Cr^{3+}$ and/or $Cr^{6+}$.

6. The layered double hydroxide material of claim 1, wherein the metal composite comprises nickel and iron in a ratio of about 1:1 to about 5:1 on a molar basis.

7. The layered double hydroxide material of claim 1, wherein the metal composite comprises nickel and chromium in a ratio of about 10:1 to about 100:1 on a molar basis.

8. The layered double hydroxide material of claim 1, wherein the metal composite comprises iron and chromium in a ratio of about 10:1 to about 30:1 on a molar basis.

9. The layered double hydroxide material of claim 1, wherein the diameter of the at least one hole is from about 2 nm to about 10 nm.

10. The layered double hydroxide material of claim 1, wherein the metal composite comprises the chromium species in a concentration of from about 0.001% to 0.1%.

11. The layered double hydroxide material of claim 1, wherein the nickel, iron and chromium are present in a ratio of about 3:1:0.05 on a molar basis.

12. A catalytic material comprising the layered double hydroxide material of claim 1.

13. An electrode comprising a conductive substrate and a catalytic material coated onto a surface of the conductive substrate, the catalytic material comprising the layered double hydroxide material of claim 1.

14. The catalytic material of claim 12, further comprising a substrate.

15. A process for preparing the catalytic material of claim 12, the process comprising:
contacting a conductive substrate with a solution comprising nickel, iron and chromium precursors,
applying a voltage across the substrate and a counter electrode through the solution to elearodeposit a composite material comprising nickel, iron and chromium species on the substrate in the form of a sheet, and
processing the electrodeposited composite material to form one or more holes.

16. The process of claim 15, wherein the processing step comprises removing a portion of the chromium species from the electrodeposited composite material.

17. The process of claim 15, wherein the processing step comprises etching the electrodeposited composite material through contact with an etching solution and applying a. second voltage across the substrate and the counter electrode.

18. The process of any one of claim 15, wherein he voltage applied across the substrate and counter electrode has a constant current.

19. The process of claim 15, wherein the substrate and counter electrode are electrodes of a two-electrode electrolytic system.

20. A method of evolving oxygen from water, the method comprising providing an electrochemical cell comprising at least two electrodes and a container for an electrolyte solution, contacting water with the at least two electrodes, and applying a voltage across the at least two electrodes, wherein at least one of the at least two electrodes comprises the layered double hydroxide material of claim 1.

21. An electrolyser comprising at least two electrodes and a power supply, wherein at least one of the at least two electrodes comprises the layered double hydroxide material of claim 1.

* * * * *